US012736085B2

(12) United States Patent
Chen et al.

(10) Patent No.: US 12,736,085 B2
(45) Date of Patent: Sep. 15, 2026

(54) BEARING

(71) Applicant: Aktiebolaget SKF, Gothenburg (SE)

(72) Inventors: Yafen Chen, Shanghai (CN); Hongyuan An, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 74 days.

(21) Appl. No.: 18/820,448

(22) Filed: Aug. 30, 2024

(65) Prior Publication Data

US 2025/0075740 A1 Mar. 6, 2025

(30) Foreign Application Priority Data

Sep. 6, 2023 (CN) ......................... 202311146624.X

(51) Int. Cl.
*F16C 33/58* (2006.01)
*F16C 19/06* (2006.01)

(52) U.S. Cl.
CPC ............ *F16C 33/583* (2013.01); *F16C 19/06* (2013.01); *F16C 2240/46* (2013.01); *F16C 2240/76* (2013.01)

(58) Field of Classification Search
CPC ........ F16C 19/06; F16C 19/16; F16C 33/583; F16C 33/585; F16C 2240/46; F16C 2240/56; F16C 2240/70; F16C 2240/76
See application file for complete search history.

(56) References Cited

U.S. PATENT DOCUMENTS

| | | | | |
|---|---|---|---|---|
| 8,794,843 | B2 * | 8/2014 | Tanaka .................. | F16C 19/548 384/512 |
| 2007/0104403 | A1 * | 5/2007 | Kawamura ........... | F16H 57/021 384/494 |
| 2016/0273584 | A1 * | 9/2016 | Braun ................... | F16C 33/583 |
| 2020/0158166 | A1 * | 5/2020 | Ejiri ........................ | F16H 48/40 |

* cited by examiner

*Primary Examiner* — Alan B Waits
(74) *Attorney, Agent, or Firm* — Stinson LLP

(57) ABSTRACT

A bearing has an inner ring, an outer ring, rollers, and a cage. The inner ring has an inner raceway. The outer ring has an outer raceway. The rollers are located between the inner raceway and the outer raceway. The cage holds the rollers. A relative groove curvature Ri of the inner raceway satisfies Ri≥0.545, and/or a relative groove curvature Re of the outer raceway satisfies Re≥0.545. An inner diameter d of the bearing satisfies 24 mm≤d≤30 mm and a radial play Gr satisfies 13 μm≤Gr≤41 μm, or the inner diameter d of the bearing satisfies 6 mm≤d≤10 mm and the radial play Gr satisfies 8 μm≤Gr≤29 μm.

20 Claims, 3 Drawing Sheets

BEARING

CROSS-REFERENCE TO RELATED APPLICATION

This application claims priority to Chinese Application No. 202311146624.X, filed Sep. 6, 2023, the entirety of which is hereby incorporated by reference.

FIELD

The present disclosure relates to a bearing, and more specifically, to a bearing that can alleviate the problem of bearing sticking.

BACKGROUND

For a bearing operating at high temperature and low rotational speed, because grease hardens rapidly at high temperature and lubricating oil cannot be adequately separated from the lubricant at low rotational speed, the lubricating performance of the bearing is deteriorated, which causes the bearing prone to stuck and fail during operation, reducing the service life of the bearing and even causing potential safety hazards.

Therefore, it is expected to provide a bearing which can alleviate the sticking problem when operating at high temperature and low rotational speed.

SUMMARY

According to a first aspect of the present disclosure, a bearing is provided including: an inner ring having an inner raceway; an outer ring having an outer raceway; rollers located between the inner raceway and the outer raceway; a cage for holding the rollers; wherein a relative groove curvature Ri of the inner raceway satisfies Ri≥0.545, and/or a relative groove curvature Re of the outer raceway satisfies Re≥0.545; and wherein an inner diameter d of the bearing satisfies 24 mm≤d≤30 mm and a radial play Gr satisfies 13 μm≤Gr≤41 μm, or the inner diameter d of the bearing satisfies 6 mm≤d≤10 mm and the radial play Gr satisfies 8 μm≤Gr≤29 μm.

According to such solution, for bearings operating at high temperature and low rotational speed, by using a bearing with a high radial play and a large relative groove curvature, the problems of wear, sticking and even locking of the bearing during operation can be alleviated, and the reliability and service life of the bearing are improved.

In some solutions, the inner diameter d of the bearing satisfies 24 mm≤d≤30 mm and the radial play Gr satisfies 23 μm≤Gr≤36 μm. Preferably, the inner diameter d of the bearing satisfies 24 mm≤d≤30 mm and the radial play Gr satisfies 23 μm≤Gr≤28 μm. More preferably, the inner diameter d of the bearing satisfies 6 mm≤d≤10 mm and the radial play Gr satisfies 8 μm≤Gr≤14 μm.

In some solutions, the relative groove curvature Ri of the inner raceway satisfies Ri≥0.55, and/or the relative groove curvature Re of the outer raceway satisfies Re≥0.55.

In some solutions, the relative groove curvature Ri of the inner raceway satisfies Ri≤0.57, and/or the relative groove curvature Re of the outer raceway satisfies Re≤0.57. Preferably, the relative groove curvature Ri of the inner raceway satisfies Ri≤0.555, and/or the relative groove curvature Re of the outer raceway satisfies Re≤0.555.

In some solutions, a Rockwell hardness of the material of the inner raceway and/or the outer raceway may be less than or equal to 62 HRC. Preferably, the Rockwell hardness of the material of the inner raceway and/or the outer raceway is greater than or equal to 58 HRC.

According to such solution, by using the inner raceway and/or the outer raceway with lower hardness, the inner raceway and/or the outer raceway are more easily deformed, thus alleviating the problems of wear and sticking of the bearing during operation.

In some solutions, lubricant is attached to the inner raceway and the outer raceway, and an oil separation degree of the lubricant is greater than 1%.

According to such solution, by using lubricant with high oil separation degree, more lubricating oil can be separated from the lubricant even under the operating condition of low rotational speed of the bearing, thus reducing friction between the rollers and the inner ring and/or the outer ring, and further alleviating the problems of wear and sticking of the bearing during operation.

In some solutions, respective surfaces of the inner raceway and/or the outer raceway may be formed of an oxidation-resistant material.

According to such solution, the problem that the bearing is easy to be oxidized when operating at high temperature can be solved, thus improving the performance of the bearing and prolonging the service life of the bearing.

In some solutions, the retained austenite of the material of the inner raceway and/or the outer raceway can be less than 3%.

In some solutions, a rotational speed of the bearing is ≤14,000 rpm, and the operating temperature of the bearing is ≤250° C. Preferably, the operating temperature of the bearing is ≤200° C.

In some solutions, the rotational speed of the bearing during operation is ≤5 rpm, and the operating temperature range of the bearing is 140±5° C. Preferably, the rotational speed of the bearing during operation is ≤0.5 rpm.

REFERENCE NUMERALS

Figure 1:
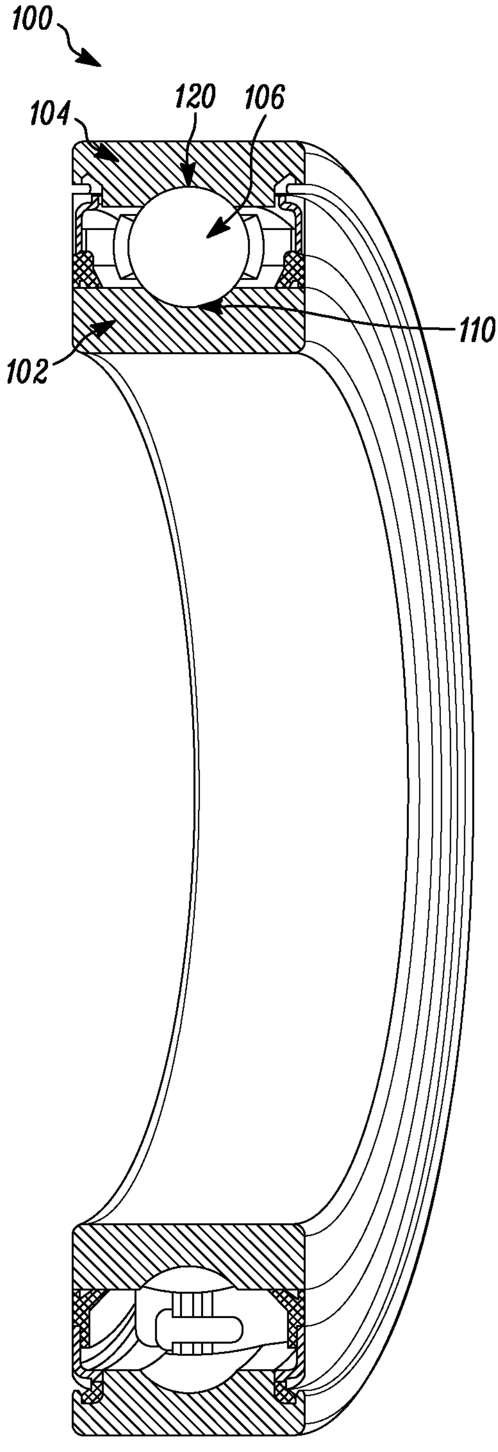
FIG. 1 shows a schematic view of a bearing according to some embodiments of the present disclosure.

100 bearing, 102 inner ring, 104 outer ring, 106 roller, 108 cage, 110 inner raceway and 120 outer raceway.

DETAILED DESCRIPTION

In order to make the purpose, solutions and advantages of the technical scheme of the present disclosure clearer, technical solutions of some embodiments of the present disclosure will be described hereafter clearly and completely with the accompanying drawings of some specific embodiments of the present disclosure. Unless otherwise specified, the terms used herein have the ordinary meaning in the art. In the drawings, the same reference numerals represent the same parts.

Figure 2:
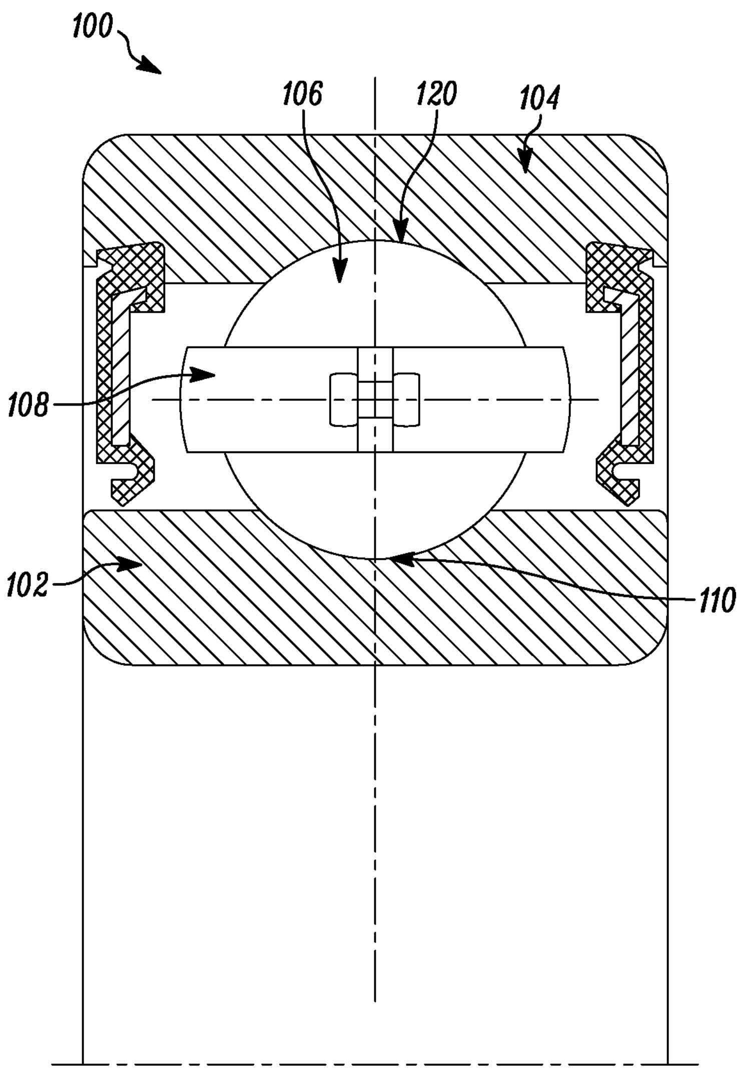
FIG. 2 shows a partial schematic view of a bearing according to some embodiments of the present disclosure.

FIGS. 1 and 2 show schematic views of a bearing 100 according to some embodiments of the present disclosure.

The bearing 100 includes an inner ring 102, an outer ring 104, rollers 106 and a cage 108. The inner ring 102 and the outer ring 104 can rotate concentrically with respect to each other, and the inner ring 102 and the outer ring 104 have an inner raceway 110 and an outer raceway 120, respectively, with the rollers 106 interposed between the inner raceway 110 and the outer raceway 120. Lubricant is attached to the inner raceway 110 and the outer raceway 120.

The present disclosure is directed at the bearing 100 operating under the conditions of high temperature (for example, about 140° C.) and low rotational speed (for example, less than 5 rpm or even less than 0.5 rpm). Because the grease hardens rapidly at high temperature and the lubricating oil cannot be adequately separated from the lubricant at low rotational speed, the lubricating performance of the bearing becomes deteriorated, which causes the bearing prone to stuck and fail during operation, reducing the service life of the bearing and even causing potential safety hazards. In order to reduce problems such as wear and sticking of this kind of bearing 100 during rotation, a relatively large groove curvature of the raceways and a relatively large radial play are designed for the bearing 100.

Figure 3:
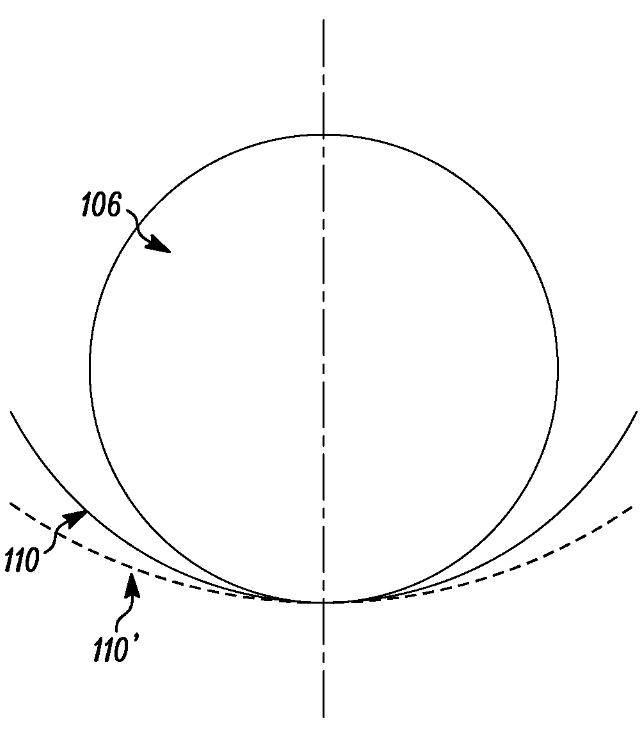
FIG. 3 shows a schematic view of the relative groove curvature according to some embodiments of the present disclosure.

In terms of the groove curvature of the raceways, as shown in FIG. 3, a relative groove curvature can be defined as the result of dividing a raceway radius by the diameter of the roller 106, and the raceway radius is the radius of the circle where the raceway arc is located. That is, the relative groove curvature Ri of the inner raceway 110 is the result of dividing the radius of the inner raceway 110 by the diameter of the roller 106. The relative groove curvature Re of the outer raceway 120 is the result of dividing the radius of the outer raceway 120 by the diameter of the roller 106. Relative groove curvature indicates curving degree of the inner raceway 110 and/or the outer raceway 120 relative to the roller 106. According to the definition of the relative groove curvature, if the relative groove curvature is equal to 0.5, it means that the curving degree of the inner raceway 110 and/or the outer raceway 120 is the same as that of the roller 106. Obviously, in order to accommodate the roller 106 in the inner raceway 110 and/or the outer raceway 120, the relative groove curvature needs to be greater than 0.5. In FIG. 3, the relative groove curvature of the inner raceway 110 (solid line) is smaller than that of the inner raceway 110' (dotted line), from which it can be intuitively seen that the larger relative groove curvature of the inner raceway 110 means the larger gap between the roller 106 and the inner raceway 110. It should be understood that the relative groove curvature of the outer raceway 120 is similar to that of the inner raceway 110 and will not be described in detail here for the sake of brevity, and FIG. 3 is only schematic and not necessarily drawn to scale. Specifically, the bearing 100 is designed such that the relative groove curvature Ri of the inner raceway 110 satisfies $Ri \geq 0.545$ and/or the relative groove curvature Re of the outer raceway 120 satisfies $Re \geq 0.545$. In some embodiments, Ri is $\geq 0.55$. In some embodiments, $0.545 \leq Ri \leq 0.57$. Preferably, $0.545 \leq Ri \leq 0.555$. More preferably, $0.55 \leq Ri \leq 0.555$. In some embodiments, Re is $\geq 0.55$. In some embodiments, $0.545 \leq Re \leq 0.57$. Preferably, $0.545 \leq Re \leq 0.555$. More preferably, $0.55 \leq Re \leq 0.555$.

Figure 4:
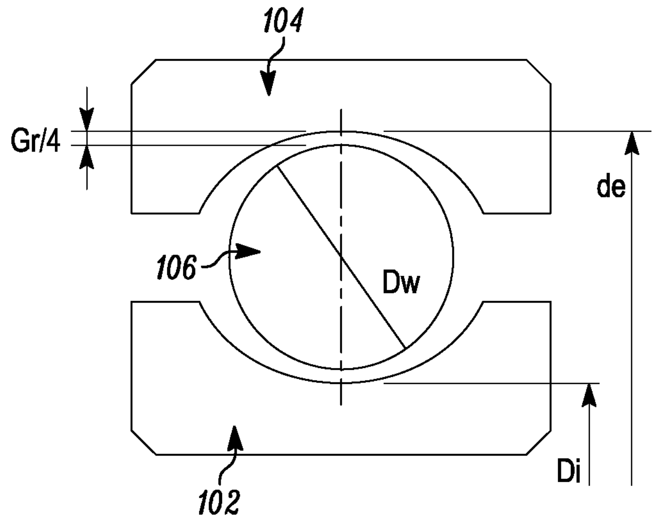
FIG. 4 shows a schematic view of the radial play according to some embodiments of the present disclosure.

In terms of radial play, as shown in FIG. 4, the radial play Gr is defined by $Gr = de - Di - 2 \times Dw$, where de is the diameter of the groove bottom of the outer ring raceway, Di is the diameter of the groove bottom of the inner ring raceway, and Dw is the diameter of the roller 106. In some embodiments, the inner diameter d of the bearing 100 satisfies 24 mm≤d≤30 mm, and the radial play Gr satisfies 13 μm≤Gr≤41 μm. Preferably, the radial play Gr satisfies 23 μm≤Gr≤36 μm. More preferably, the radial play Gr satisfies 23 μm≤Gr≤28 μm. In some embodiments, the inner diameter d of the bearing 100 satisfies 6 mm≤d≤10 mm, and the radial play Gr satisfies 8 μm≤Gr≤29 μm. Preferably, the radial play Gr satisfies 8 μm≤Gr≤14 μm.

In one aspect, the larger relative groove curvature of the inner raceway 110 and/or the outer raceway 120 makes the arc gap between the roller 106 and the inner raceway 110 and/or the outer raceway 120 larger, and in another aspect, the larger radial play makes the radial gap between the roller 106 and the raceway larger. Combining the above two aspects, the axial and the radial moving space of the roller 106 in the high-temperature operation environment is ensured at the same time, which reduces the friction between the roller 106 and the raceway in the high-temperature environment, thereby alleviating problems of wear and sticking of the bearing 100 during operation. In addition, change of either one of the relative groove curvature and the radial play will affect the operation of the bearing, so that a parameter change of one will also affect the parameter design of the other under the condition that the overall design requirements of the bearing are fixed, and under the application requirements of the above embodiments, the two cannot be simply divided and designed separately. By controlling the relative groove curvature and the radial play, the moving space of the roller 106 during the operation of the bearing 100 can be better controlled.

If the relative groove curvature is too large, it may bring the problem of decreasing bearing capacity of the bearing 100, and if the radial play is too large, it may bring the problem of great vibration of the bearing 100 during operation. Therefore, in some embodiments, not only a preferred lower limit but also a preferred upper limit is designed for the relative groove curvature and the radial play.

Preferably, a lower hardness can be designed for the material of the inner raceway 110 and/or the outer raceway 120. Specifically, the Rockwell hardness of the material of the inner raceway 110 and/or the outer raceway 120 may be less than or equal to 62 HRC. By using the inner raceway and/or the outer raceway with a lower hardness, the inner raceway and/or the outer raceway are more easily deformed, thus alleviating the problems of wear and sticking of the bearing when operating at high temperature and low rotational speed. On the other hand, in order to avoid excessive deformation and fatigue failure of an excessively soft raceway under the compression of the roller 106, it is preferable that the Rockwell hardness of the material of the inner raceway 110 and/or the outer raceway 120 can be greater than or equal to 58 HRC.

Preferably, lubricant can be attached to the inner raceway 110 and the outer raceway 120, and a large oil separation degree can be designed for the lubricant, specifically, the oil separation degree of the lubricant can be greater than 1%. By using lubricant with a large oil separation degree, more lubricating oil can be separated from the lubricant even under the condition of low rotational speed of the bearing 100, thus reducing the friction between the rollers 106 and the inner ring 102 and/or the outer ring 104, and alleviating the problems of wear and sticking of the bearing 100 during low-speed operation.

Preferably, the respective surfaces of the inner raceway 110 and/or the outer raceway 120 can be made of an oxidation-resistant material, and the oxidation-resistant material meets the requirements of no red rust appearing within 72 hours in a salt spray test based on the standard DIN EN ISO 9227 NSS. Through this technical feature, the problem that the bearing 100 is easy to be oxidized when operating under high temperature and oxygen-enriched conditions can be alleviated, thereby improving the performance of the bearing 100 and prolonging the service life of the bearing 100.

Preferably, the retained austenite of the material of the inner raceway 110 and/or the outer raceway 120 may be less than 3%.

In some embodiments, the rotational speed of the bearing 100 during operation is ≤14,000 rpm, and the operating temperature of the bearing 100 is ≤250° C. Preferably, the operating temperature of the bearing 100 is ≤200° C.

In some embodiments, the rotational speed of the bearing 100 during operation is ≤5 rpm, and the operating temperature range of the bearing is 140±5° C. Preferably, the rotational speed of the bearing during operation is ≤0.5 rpm. Operation environment of extremely low rotational speed combined with the long-term and relatively constant high temperature brings great challenges to the operation of the bearing. By adjusting the relative groove curvature and the radial play at the same time, the problems of wear and sticking of the bearing 100 when operating in high-temperature environment are alleviated, By improving the lubricant and the surface treatment, the problem of sticking failure of the bearing 100 at extremely low rotational speed is alleviated.

A number of exemplary embodiments of the present disclosure have been described in detail herein with reference to some preferred embodiments. However, those skilled in the art can understand that various variations and modifications can be made to the above specific embodiments without departing from the concept of the present disclosure, and various technical features and structures proposed in the present disclosure can be combined without exceeding the protection scope of the present disclosure, which is determined by the appended claims.

What is claimed is:

1. A bearing comprising:

an inner ring having an inner raceway, the inner raceway having a radius and a relative groove curvature (Ri), the inner raceway having a groove bottom having a diameter (Di);

an outer ring having an outer raceway, the outer raceway having a radius and a relative groove curvature (Re), the outer raceway having a groove bottom having a diameter (de);

rollers located between the inner raceway and the outer raceway, the rollers having a diameter (Dw);

a cage for holding the rollers;

an inner diameter (d); and a radial play (Gr), the radial play (Gr) is defined as Gr=de−Di−2×Dw;

wherein the relative groove curvature (Ri) of the inner raceway is defined as the radius of the inner raceway divided by the diameter (Dw) of the rollers;

wherein the relative groove curvature (Re) of the outer raceway is defined as the radius of the outer raceway divided by the diameter (Dw) of the rollers;

wherein the relative groove curvature (Ri) of the inner raceway satisfies Ri≥0.545, and/or a relative groove curvature (Re) of the outer raceway satisfies Re≥0.545; and wherein the inner diameter (d) of the bearing satisfies 24 mm≤d≤30 mm and the radial play (Gr) satisfies 13 μm≤Gr≤41 μm, or the inner diameter (d) of the bearing satisfies 6 mm≤d≤10 mm and the radial play (Gr) satisfies 8 μm≤Gr≤29 μm.

2. The bearing according to claim 1, wherein the inner diameter (d) of the bearing satisfies 24 mm≤d≤30 mm and the radial play (Gr) satisfies 23 μm≤Gr≤36 μm.

3. The bearing according to claim 1, wherein the inner diameter (d) of the bearing satisfies 24 mm≤d≤30 mm and the radial play (Gr) satisfies 23 μm≤Gr≤28 μm.

4. The bearing according to claim 1, wherein the inner diameter (d) of the bearing satisfies 6 mm≤d≤10 mm and the radial play (Gr) satisfies 8 μm≤Gr≤14 μm.

5. The bearing according to claim 1, wherein the relative groove curvature (Ri) of the inner raceway satisfies Ri≥0.55, and/or the relative groove curvature (Re) of the outer raceway satisfies Re≥0.55.

6. The bearing according to claim 1, wherein the relative groove curvature (Ri) of the inner raceway satisfies Ri≤0.57, and/or the relative groove curvature (Re) of the outer raceway satisfies Re≤0.57.

7. The bearing according to claim 1, wherein the relative groove curvature (Ri) of the inner raceway satisfies Ri≤0.555, and the relative groove curvature (Re) of the outer raceway satisfies Re≤0.555.

8. The bearing according to claim 1, wherein a Rockwell hardness of material of the inner raceway and/or the outer raceway is less than or equal to 62 HRC.

9. The bearing according to claim 8, wherein the Rockwell hardness of material of the inner raceway and/or the outer raceway is greater than or equal to 58 HRC.

10. The bearing according to claim 1, wherein lubricant is attached to the inner raceway and the outer raceway, and an oil separation degree of the lubricant is greater than 1%.

11. The bearing according to claim 10, wherein the lubricant is a grease.

12. The bearing according to claim 1, wherein respective surfaces of the inner raceway and/or the outer raceway are formed of an oxidation-resistant material.

13. The bearing according to claim 1, wherein retained austenite of material of the inner raceway and/or the outer raceway is less than 3%.

14. The bearing according to claim 1, wherein the relative groove curvature (Ri) of the inner raceway satisfies Ri≥0.55.

15. The bearing according to claim 1, wherein the relative groove curvature (Re) of the outer raceway satisfies Re≥0.55.

16. The bearing according to claim 1, wherein the relative groove curvature (Ri) of the inner raceway satisfies 0.545≤Ri≤0.555, and the relative groove curvature (Re) of the outer raceway satisfies 0.545≤Re≤0.555.

17. A method of bearing operation, the method comprising:

operating the bearing at a rotational speed of ≤14,000 rpm and at an operating temperature of ≤250° C.;

wherein the bearing comprises:

an inner ring having an inner raceway, the inner raceway having a radius and a relative groove curvature (Ri), the inner raceway having a groove bottom having a diameter (Di);

an outer ring having an outer raceway, the outer raceway having a radius and a relative groove curvature (Re), the outer raceway having a groove bottom having a diameter (de);

rollers located between the inner raceway and the outer raceway, the rollers having a diameter (Dw);

a cage for holding the rollers;

an inner diameter (d); and a radial play (Gr), the radial play (Gr) is defined as Gr=de−Di−2×Dw;

wherein the relative groove curvature (Ri) of the inner raceway is defined as the radius of the inner raceway divided by the diameter (Dw) of the rollers;

wherein the relative groove curvature (Re) of the outer raceway is defined as the radius of the outer raceway divided by the diameter (Dw) of the rollers;

wherein the relative groove curvature (Ri) of the inner raceway satisfies $Ri \geq 0.545$, and/or a relative groove curvature (Re) of the outer raceway satisfies $Re \geq 0.545$; and wherein the inner diameter (d) of the bearing satisfies 24 mm≤d≤30 mm and the radial play (Gr) satisfies 13 μm≤Gr≤41 μm, or the inner diameter (d) of the bearing satisfies 6 mm≤d≤10 mm and the radial play (Gr) satisfies 8 μm≤Gr≤29 μm.

18. The method of claim 17, wherein the operating temperature is less than or equal to 200° C.

19. A method of bearing operation, the method comprising:

operating the bearing at a rotational speed of ≤5 rpm and at an operating temperature range of 140±5° C.;

wherein the bearing comprises:

an inner ring having an inner raceway, the inner raceway having a radius and a relative groove curvature (Ri), the inner raceway having a groove bottom having a diameter (Di);

an outer ring having an outer raceway, the outer raceway having a radius and a relative groove curvature (Re), the outer raceway having a groove bottom having a diameter (de);

rollers located between the inner raceway and the outer raceway, the rollers having a diameter (Dw);

a cage for holding the rollers;

an inner diameter (d); and a radial play (Gr), the radial play (Gr) is defined as $Gr = de - Di - 2 \times Dw$;

wherein the relative groove curvature (Ri) of the inner raceway is defined as the radius of the inner raceway divided by the diameter (Dw) of the rollers;

wherein the relative groove curvature (Re) of the outer raceway is defined as the radius of the outer raceway divided by the diameter (Dw) of the rollers;

wherein the relative groove curvature (Ri) of the inner raceway satisfies $Ri \geq 0.545$, and/or a relative groove curvature (Re) of the outer raceway satisfies $Re \geq 0.545$; and wherein the inner diameter (d) of the bearing satisfies 24 mm≤d≤30 mm and the radial play (Gr) satisfies 13 μm≤Gr≤41 μm, or the inner diameter (d) of the bearing satisfies 6 mm≤d≤10 mm and the radial play (Gr) satisfies 8 μm≤Gr≤29 μm.

20. The method of claim 19, wherein the rotational speed is ≤0.5 rpm.

* * * * *